(12) United States Patent
Hedrick

(10) Patent No.: US 6,837,501 B1
(45) Date of Patent: Jan. 4, 2005

(54) SAW DOLLY AND STAND

(76) Inventor: Michael C. Hedrick, 406 Nogales Ave., Palm Bay, FL (US) 32907

( * ) Notice: Subject to any disclaimer, the term of this patent is extended or adjusted under 35 U.S.C. 154(b) by 102 days.

(21) Appl. No.: 10/243,421

(22) Filed: Sep. 16, 2002

(51) Int. Cl.$^7$ .................................................. B62B 1/04
(52) U.S. Cl. ..................... 280/30; 280/47.19; 144/286.1
(58) Field of Search ........................... 280/47.34, 47.35, 280/47.33, 47.18, 47.19, 47.2, 47.16, 30, 652, 47.26, 47.29, 79.3, 640, 651, 654, 659, 641, 47.131, 47.17, 47.27; 83/477.2, 468, 859; 144/286.1, 286.5, 48.7; 414/458, 495, 498; 296/17, 20

(56) References Cited

U.S. PATENT DOCUMENTS 3,637,232 A * 1/1972 Bourgraf et al. ............ 280/641
3,669,031 A * 6/1972 Cole ........................... 280/641
3,941,002 A * 3/1976 Tucker, Jr. ................... 144/48.7
4,192,541 A * 3/1980 Ferneau ....................... 280/640
4,620,712 A * 11/1986 Blackwell ................... 280/47.2
4,969,496 A * 11/1990 Romans ..................... 144/286.1
5,775,865 A * 7/1998 Capilupi, Jr. ............... 414/498
5,778,953 A * 7/1998 Braddock ................ 144/286.1
5,863,052 A * 1/1999 Roman ......................... 280/30
6,240,987 B1 * 6/2001 Birkeland ................ 144/286.1
6,360,797 B1 * 3/2002 Brazell et al. ........... 144/286.1

* cited by examiner

Primary Examiner—Hau Phan

(57) ABSTRACT

A saw dolly and stand for providing an easy method for the transportation and setup of a wet saw includes a dolly that has a front side and a back side. A pair of wheel assemblies is attached to the back side. A stand assembly is removably attached to the back side of the dolly. The stand assembly includes a plurality of sleeves. A pair of foot members is removably extendable into the sleeves. A plurality of mounts is attached to the front side of the dolly for removably attaching the wet saw thereto.

9 Claims, 4 Drawing Sheets

SAW DOLLY AND STAND

BACKGROUND OF THE INVENTION

1. Field of the Invention

The present invention relates to portable workstations and more particularly pertains to a new portable work station for providing an easy method for the transporting and setup of a tub (wet) saw.

2. Description of the Prior Art

The use of portable workstations is known in the prior art. U.S. Pat. No. 5,863,052 describes a collapsible carpentry work station and push cart combination comprising an elongated frame structure including a pair of side frames and a collapsible wheel carrying case. Another type of portable workstation is U.S. Pat. No. 3,669,031 describes a portable collapsible worktable for carrying tools thereon, which is rollably transportable between different locations and collapsible in a manner and which facilitates easy storage. U.S. Pat. No. Des 381,994 describes an ornamental design for a woodcutter. Other related patents include U.S. Pat. No. 3,747,457, U.S. Pat. No. 4,620,712, and U.S. Pat. No. 3,668,961.

While these devices fulfill their respective, particular objectives and requirements, the need remains for a device is of sturdy construction and required minimal time and effort to setup and transport.

SUMMARY OF THE INVENTION

The object of the present invention is to provide a new portable workstation that would provide individuals with a quick an easy way to setup and transport a tub saw for operation.

Another object of the present invention is to provide a new portable workstation that would reduce strain to the arms and back of a user when transporting a tub saw.

To this end, the present invention generally comprises a dolly that has a front side and a back side. A pair of wheel assemblies is attached to the back side. A stand assembly is removably attached to the back side of the dolly. The stand assembly includes a plurality of sleeves. A pair of foot members is removably extendable into the sleeves. A plurality of mounts is attached to the front side of the dolly, and the saw is removably coupled to the mounts.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty, which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
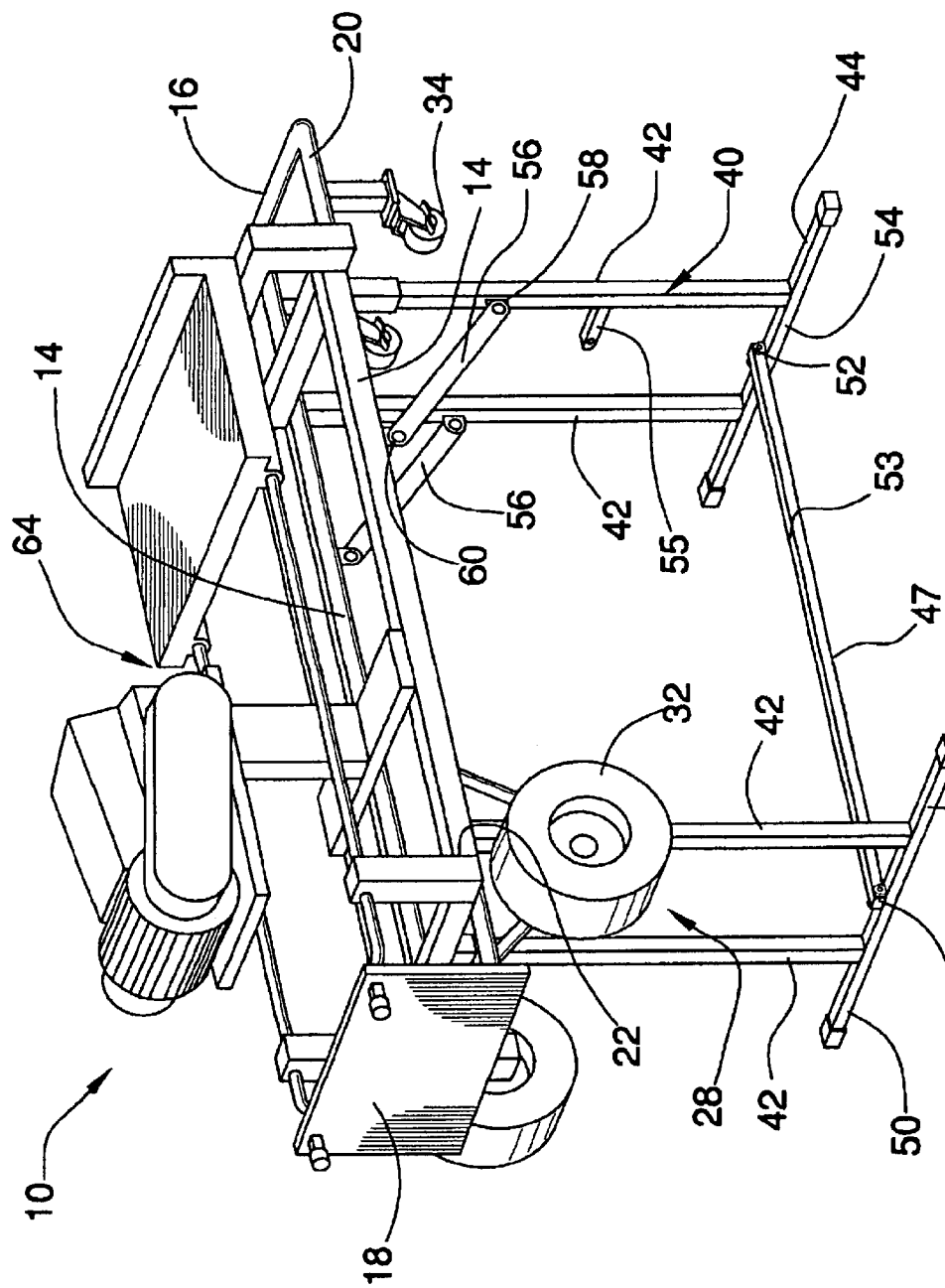
FIG. 1 is a perspective view of a saw dolly and stand according to the present invention.
Figure 2:
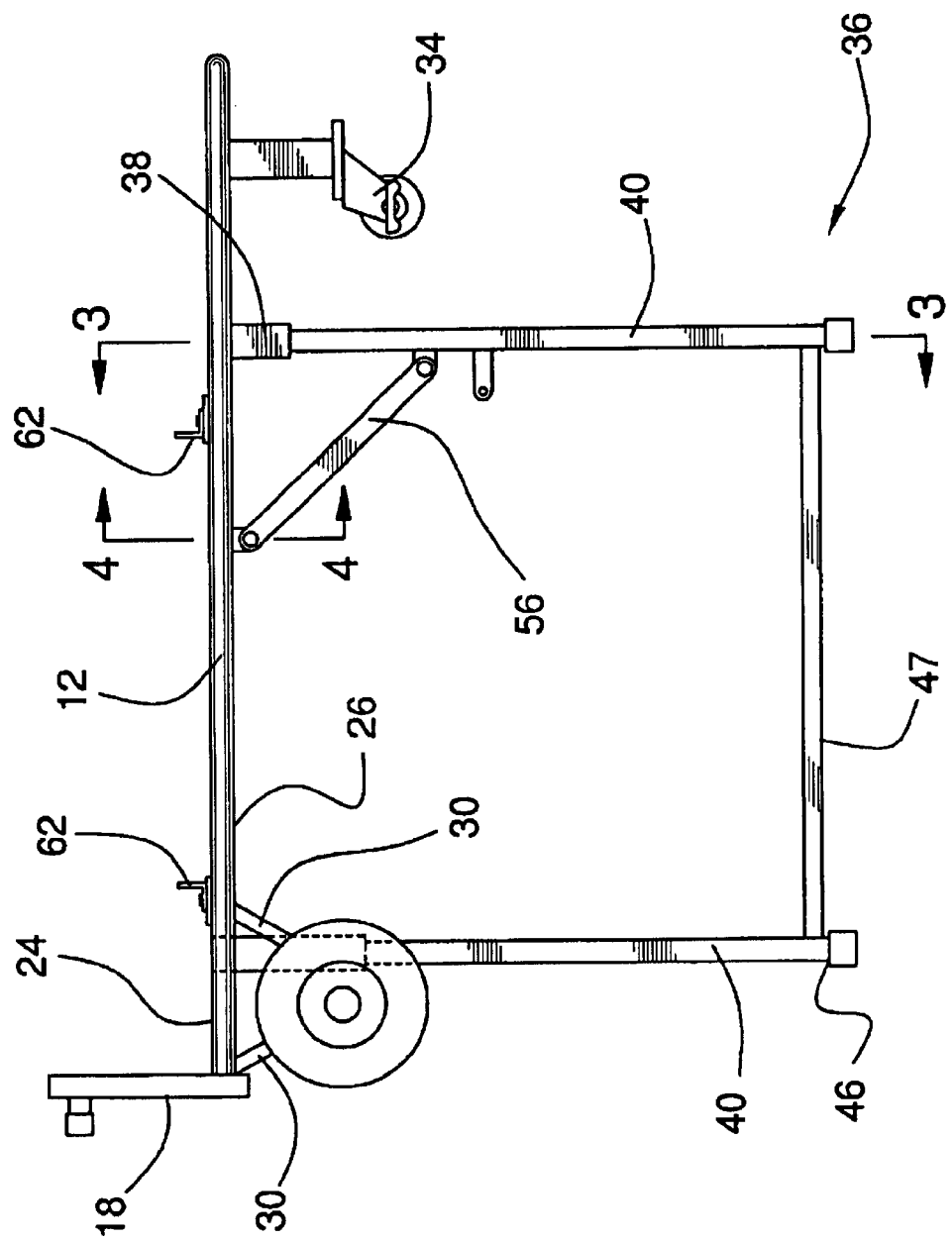
FIG. 2 is a side view of the present invention.
Figure 3:
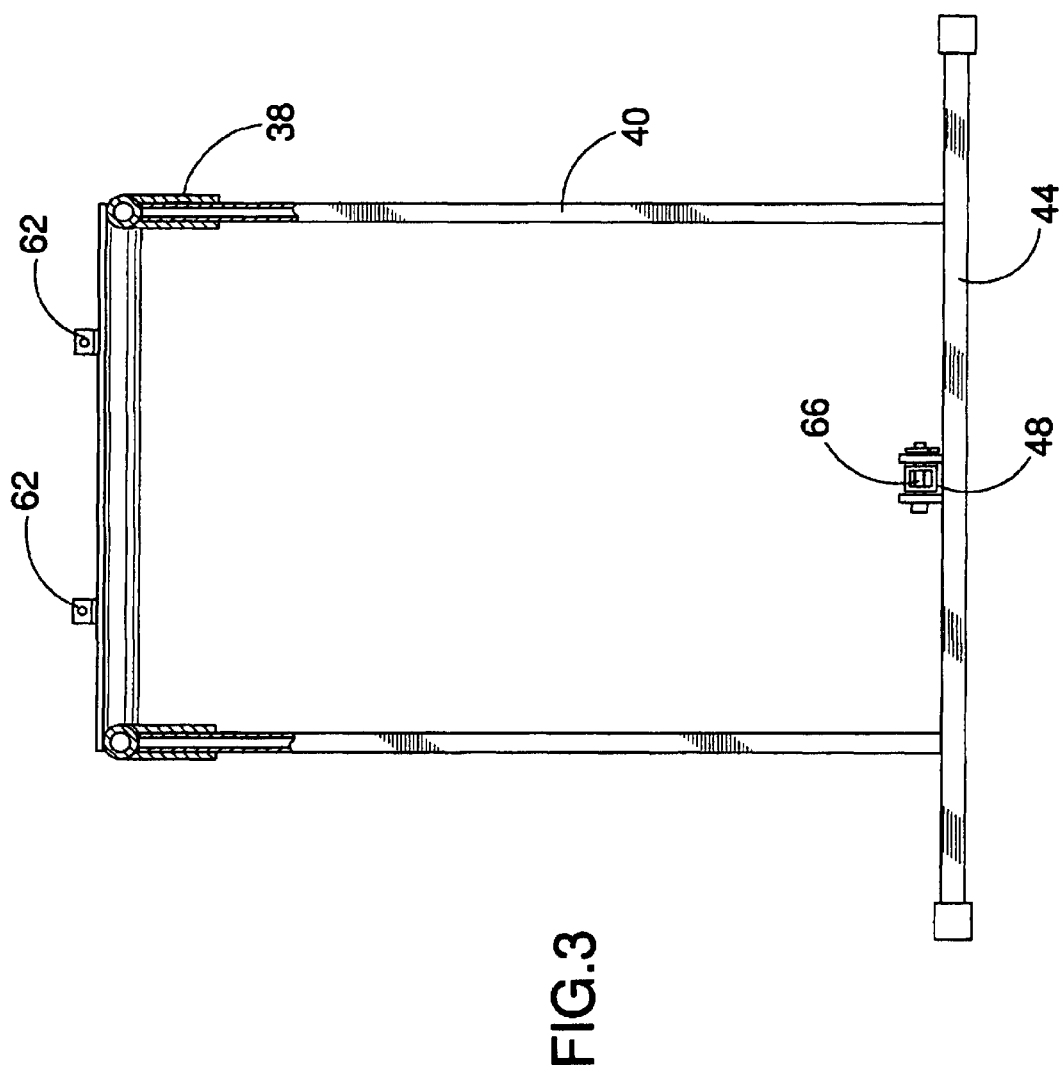
FIG. 3 is a cross-sectional view taken along the line 3—3 of FIG. 2 of the present invention.
Figure 4:
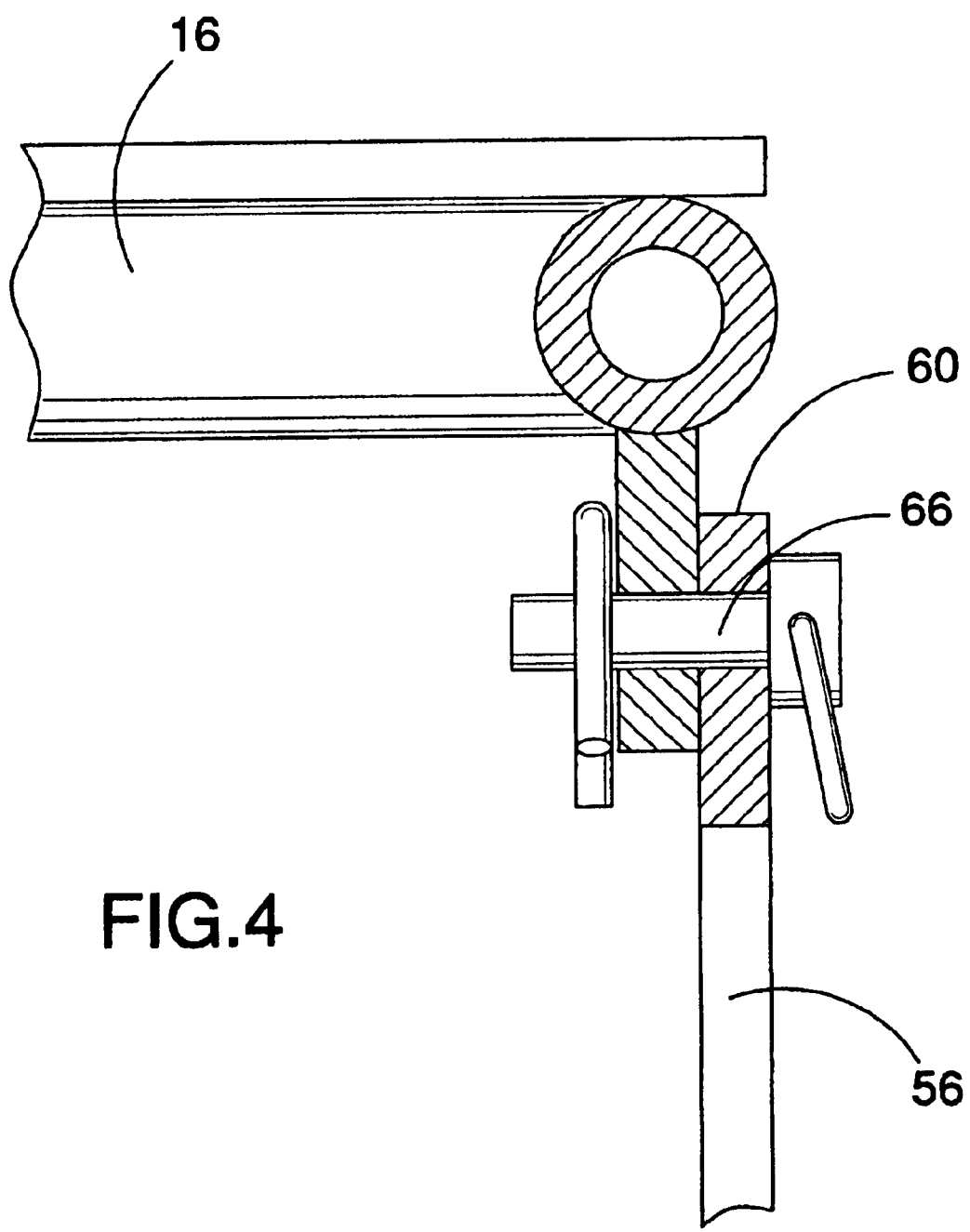
FIG. 4 is a cross-sectional view taken along the line 4—4 of FIG. 2 of the present invention.

With reference now to the drawings, and in particular to FIGS. 1 through 4 thereof, a new portable work stations embodying the principles and concepts of the present invention and generally designated by the reference numeral 10 will be described.

As best illustrated in FIGS. 1 through 4, saw dolly and stand 10 generally comprises a dolly 12 including a pair of side rods 14, an end rod 16 and a bottom plate 18. The side rods 14 each have a first end 20 and a second end 22. The first end 20 is permanently attached to the end rod 16 at a generally perpendicular angle. The bottom plate 18 is attached to the second end 22 of the side rods 14. The side rods 14 are orientated parallel to each other. The dolly 12 has a front side 24 and a back side 26, and the bottom plate 18 extends outwardly away from the front side 24.

A pair of wheel assemblies 28 is attached to the back side 26. Each of the wheel assemblies 28 is attached to one of the side rods 14. The wheel assemblies 28 are positioned generally adjacent to the plate 18. Each of the wheel assemblies 28 includes a pair of support bars 30 attached to a corresponding side rod 14 and a wheel 32 rotatably attached to the support bars 30.

A pair of swivel wheels 34 is rotatably attached to the back side 26. Each of the swivel wheels 34 is rotatably attached to one of the side rods 14 and positioned generally adjacent to the end rod 16.

A stand assembly 36 is removably attached to the back side 26 of the dolly 12. The stand assembly 36 includes a plurality of sleeves 38 attached to the side rods 14 such that there is a pair of sleeves 38 attached to each of the side rods 14. The sleeves 38 are spaced from each other.

A pair of foot members 40 is removably extendable into the sleeves 38. Each of the foot members 40 includes a pair of parallel elongate members 42 and a foot portion 44 is attached to a bottom end 46 of the elongate members 42. Each of the elongate members 42 is removably extendable into one of the sleeves 38 such that each of the foot members 40 is releasably coupled to each of the rods.

A foot member support 47 has a first end 48 releasably coupled to a first of the foot portions 50 and a second end 52 releasably hingedly coupled to a second of the foot portions 54. The first end 48 is preferably releasably attached with a connecting pin 66 or another conventional securing member so that the foot member support 47 can be attached to bracket 55 when foot members are removed from the sleeves 38. This can be accomplished with a pin extended through bracket 55 and into opening 53 or by another conventional fastening means.

A pair of elongate member supports 56 is releasably attached by connecting pins 66 to the dolly 12. Each of the elongate member supports 56 has a first end 58 pivotally coupled to one of the elongate members 42 nearer the end rod 16 than the bottom plate 18 and a second end 60 releasably attached again by connecting pins 66 to one of the side rods 14. A plurality of mounts 62 is attached to the front side 24 of the dolly 12, and the saw 64 is removably coupled to the mounts 62.

In use, a user would use the present invention similar to a convention dolly 12 to transport the saw 64, which is attachable to the mounts 62, to a desired location. When using the wet saw 64 or tub a user would raise the dolly 12 off the ground and position it such that each of the elongate members 42 is extended into one of the sleeves 38 to place the saw in a horizontal position. This would position the wet saw 64 in a position for being used. When finished, the elongate members would be removed from the sleeve for storage and the dolly 12 used for transporting the wet saw 64.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A saw dolly and support assembly for removably attaching a saw thereto, said assembly comprising:
    a dolly having a front side and a back side, said dolly including a pair of side rods, an end rod and a bottom plate, said side rods each having a first end and a second end, said first ends being attached to said end rod at a generally perpendicular angle, said plate being attached to said second ends of said side rods, said side rods being orientated parallel to each other, said plate extending outwardly away from said front side;
    a pair of wheel assemblies being attached to said back side;
    a stand assembly being removably attached to said back side of said dolly, said stand assembly including;
    a plurality of sleeves; and
    a pair of foot members being removably extendable into said sleeves; and
    a plurality of mounts being attached to said front side of said dolly, the saw being removably coupled to said mounts.

2. The saw dolly and support assembly as in claim 1, wherein each of said wheel assemblies is attached to one of said side rods, said wheel assemblies being positioned generally adjacent to said plate.

3. The saw dolly and support assembly as in claim 2, wherein each of said wheel assemblies includes a pair of support bars attached to a corresponding side rod and a wheel rotatably attached to said support bars.

4. The saw dolly and support assembly as in claim 2, further including a pair of swivel wheels being attached to said back side, each of said swivel wheels being attached to one of said side rods and positioned generally adjacent to said end rod.

5. The saw dolly and support assembly as in claim 2, wherein there are a pair of sleeves attached to each of said side rods, said sleeves being spaced from each other.

6. The saw dolly and support assembly as in claim 2, wherein each of said foot members includes a pair of parallel elongate members and a foot portion attached to a bottom end of said elongate members, each of said elongate members being removably extendable into one of said sleeves such that each of said foot members is releasably coupled to each of said rods.

7. The saw dolly and support assembly as in claim 6, further including a foot member support having a first end releasably coupled to a first of said foot portions and a second end releasably coupled to a second of said foot portions.

8. The saw dolly and support assembly as in claim 6, further including a pair of elongate member supports being releasably attached to said dolly, each of said elongate member supports having a first end pivotally coupled to one of said elongate members and a second end releasably attached to one of said side rods.

9. A saw dolly and support assembly for removably attaching a saw thereto, said assembly comprising:
    a dolly including a pair of side rods, an end rod and a bottom plate, said side rods each having a first end and a second end, said first ends being attached to said end rod at a generally perpendicular angle, said plate being attached to said second ends of said side rods, said side rods being orientated parallel to each other, said dolly having an front side and a back side, said plate extending outwardly away from said front side;
    a pair of wheel assemblies being attached to said back side, each of said wheel assemblies being attached to one of said side rods, said wheel assemblies being positioned generally adjacent to said plate, each of said wheel assemblies including a pair of support bars attached to a corresponding side rod and a wheel rotatably attached to said support bars;
    a pair of swivel wheels being attached to said back side, each of said swivel wheels being attached to one of said side rods and positioned generally adjacent to said end rod;
    a stand assembly being removably attached to said back side of said dolly, said stand assembly including;
        a plurality of sleeves being attached to said side rods such that there are a pair of sleeves attached to each of said side rods, said sleeves being spaced from each other;
        a pair of foot members being removably extendable into said sleeves, each of said foot members including a pair of parallel elongate members and a foot portion attached to a bottom end of said elongate members, each of said elongate members being removably extendable into one of said sleeves such that each of said foot members is releasably coupled to each of said rods;
        a foot member support having a first end releasably coupled to a first of said foot portions and a second end releasably coupled to a second of said foot portions;
        a pair of elongate member supports being releasably attached to said dolly, each of said elongate member supports having a first end pivotally coupled to one of said elongate members and a second end releasably attached to one of said side rods; and a plurality of mounts being attached to said front side of said dolly, the saw being removably coupled to said mounts.

* * * * *